Feb. 16, 1926.  
R. H. MacINNES  
ELECTRIC STOVE  
Filed Feb. 9, 1925    3 Sheets-Sheet 1

1,573,080

INVENTOR.  
Robert H. MacInnes  
BY  
ATTORNEYS.

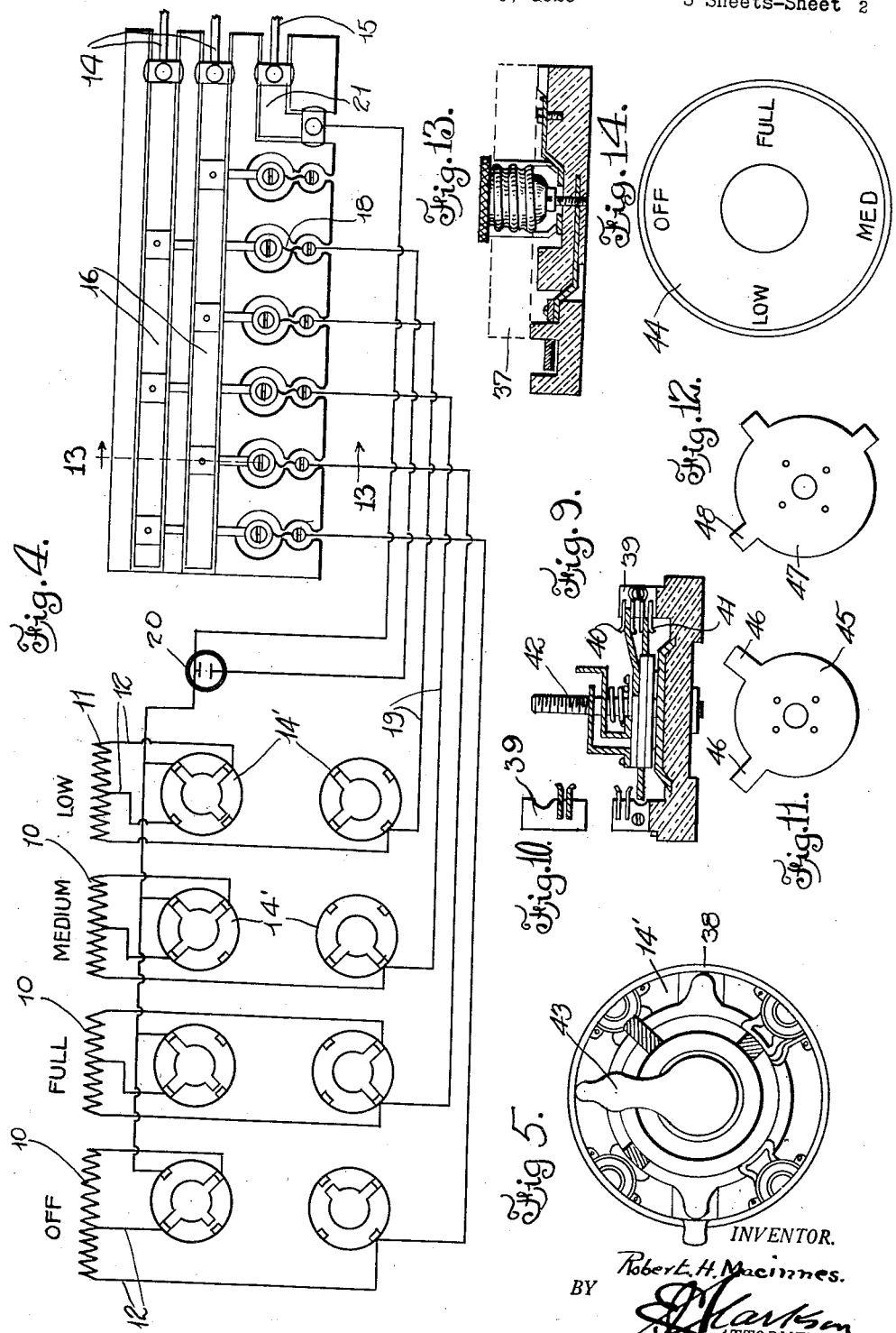

Feb. 16, 1926.

R. H. MacINNES

ELECTRIC STOVE

Filed Feb. 9, 1925

Inventor
Robert H. MacInnes
By H. G. Hendry
Attorney

Patented Feb. 16, 1926.

1,573,080

UNITED STATES PATENT OFFICE.

ROBERT H. MacINNES, OF HAMILTON, ONTARIO, CANADA, ASSIGNOR TO D. MOORE COMPANY, LIMITED, OF HAMILTON, ONTARIO, CANADA.

ELECTRIC STOVE.

Application filed February 9, 1925. Serial No. 7,906.

*To all whom it may concern:*

Be it known that ROBERT H. MACINNES, a subject of the King of Great Britain, residing at Hamilton, in the county of Wentworth and Province of Ontario, Canada, has invented certain new and useful Improvements in an Electric Stove, of which the following is a specification.

This invention relates to electric stoves and has special reference to wiring for such stoves.

The invention further has reference to a fuse block for use in connection with the improved wiring.

Heretofore, in the wiring of electric stoves it has been customary to provide a pair of wires for each heating element which lead from the element to a fuse block supported on the side of the stove and to connect them, at the fuse block, to a pair of fuses, one for each wire. Heretofore, in the wiring of electrical stoves it was found necessary to equally distribute the load, on a three wire supply system, it is usual in such supply systems to have the neutral or balance wire grounded, as the voltage on the two outer leads would be 220 volts, while the voltage from either side to the neutral would be 110 volts. Should the neutral be fused and same blown, the appliance would be subject to 220 volts, which would destroy the unit of the appliance. With this in view it was deemed unnecessary to continue the fusing of the neutral and have same go solid through the hookup, fusing each side of the positive leads, with a separate fuse, thus when fuse is blown the unit fed by same is cut directly off at the source of supply. In the old method a standard two wire fuse block or blocks were employed having two fused leads from same to the unit, the supply mains to fuse blocks had the 220 volt leads equally divided to one side, and the neutral pass clear through the other side.
The two leads to unit having fused 110 volt lines, in other words, a two wire system, within a three wire system. Experience had shown that the value of fusing the grounded neutral had no advantages, but disadvantages also employment of unnecessary equipment. With the new system we have constructed an adaptable appliance, saving the unnecessary equipment, giving the necessary protection electrically through reducing entirely defects arising from a fused neutral, on removal of the fuse in the new system, it cuts the supply at its source, and allows the operator to make with safety any desired adjustments in the equipment necessary. Thus in a stove having three top heating elements, two oven heating elements and a socket for connection for an electric iron or the like, no less than twelve lengths of wire led from such elements to the fuse block and twelve fuses were required.

The important object of the present invention is to so improve the system of wiring in such stoves as to eliminate one-half the fuses and to have a single wire take the place of one-half of the local connections to the heating elements and socket.

A second object of the invention is to provide an improved form of fuse block for this purpose.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 4 is a diagram of the wiring connections in such a stove.

Fig. 5 is a plan view of a switch adapted for use in connection with this invention.

Figure 9 is a vertical median section through the switch.

Figure 10 is a view of one of the contact posts removed from the switch.

Figure 11 is a plan view of the bottom plate of such a switch.

Figure 12 is a plan view of the top plate thereof.

Figure 13 is a section on the line 13—13 of Figure 4.

Figure 14 is a view of the face plate or indicator plate of the switch.

Figure 1:
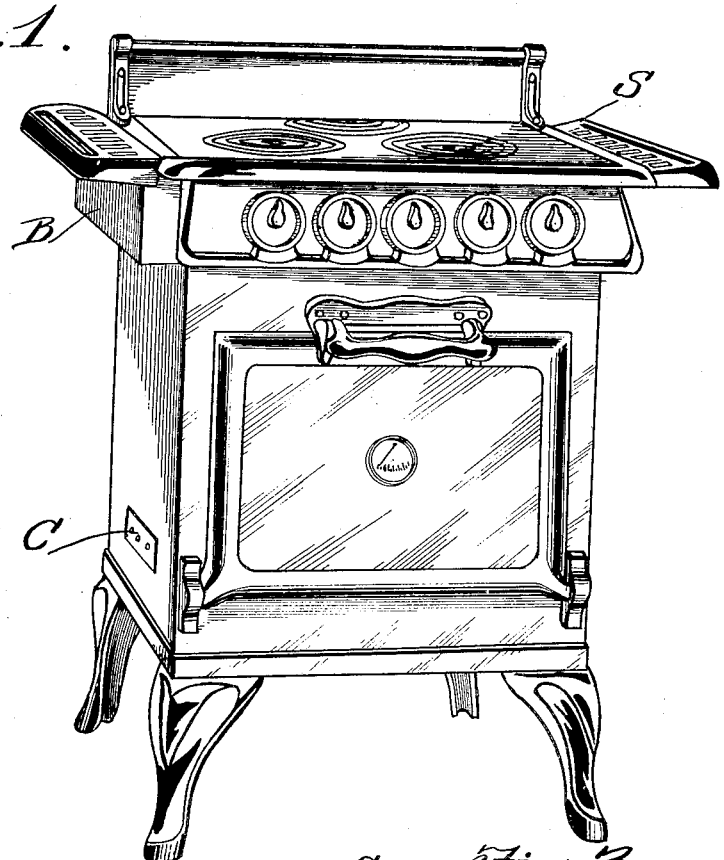
Figure 1 is a perspective view of a stove wired in accordance with this invention and disclosing the greatly reduced size of the fuse box.
Figure 2:
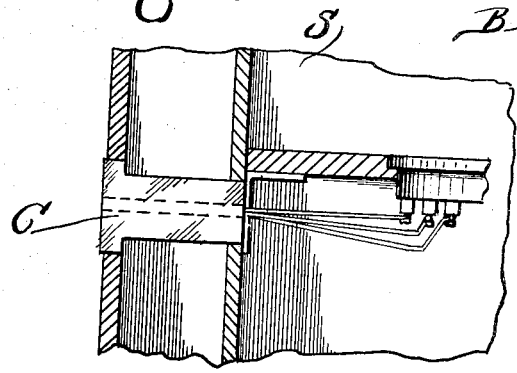
Figure 2 is a detail section through the oven wall showing the insulating block for an oven heating element.
Figure 3:
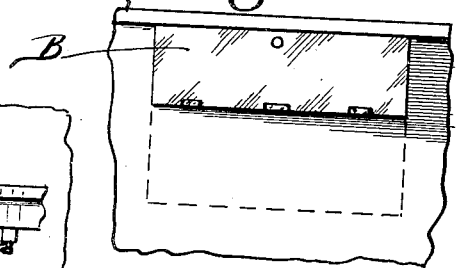
Figure 3 is a detail showing in full lines the new fuse box and in dotted lines the usual fuse box.
Figure 6:
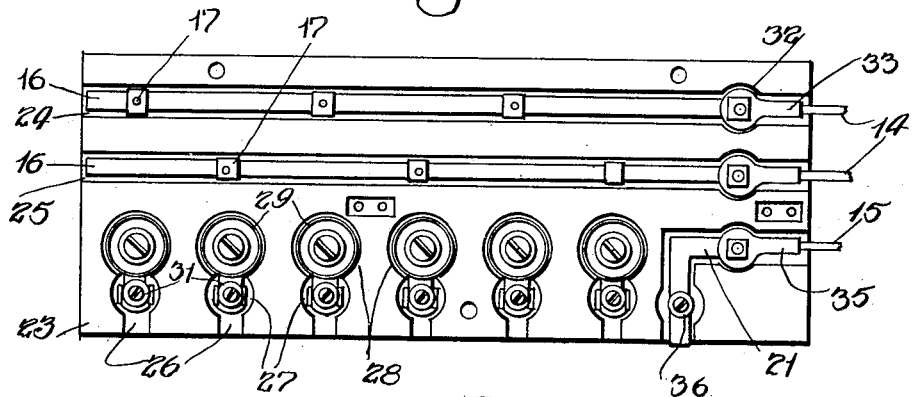
Figure 6 is a plan view of the fuse block with the cover removed.
Figure 7:
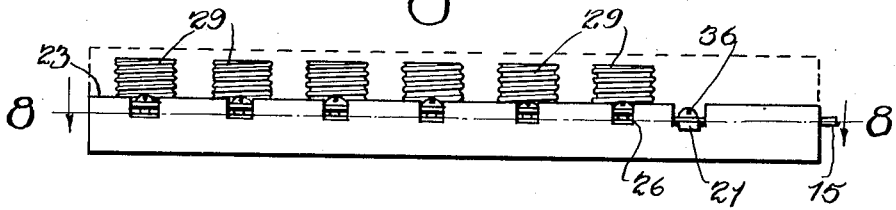
Figure 7 is a side view thereof.
Figure 8:
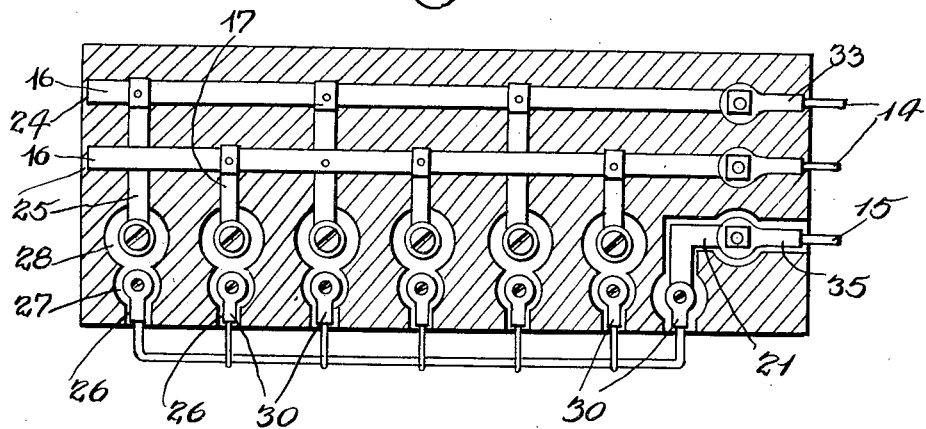
Figure 8 is a section on the line 8—8 of Figure 7.

In the present embodiment of the invention there is disclosed a typical form of stove S having a fuse box B and conductor blocks C for the oven heating elements.

This stove is shown as equipped with three 3-heat top heating elements 10 and two 3-heat oven heating elements 11 as well as a socket 12 for connecting an electric iron or the like. Each of the heater elements is connected by three wires 13 with a standard commercial 3-heat switch 14 and it is to be noted that the supply lines in Figure 5 are all indicated in light lines while the neutral is indicated by heavy lines. At 14 is shown a pair of supply mains while the neutral main is shown at 15. Each supply main is connected to a bus bar 16 from which extend branches 17 connected to fuses 18. From these fuses lead local supply lines 19 which are connected to the plug socket 20 and the switches 14'.

The neutral main is connected to a bus bar 21 which is in turn connected to a local neutral 22 having the switches 14 and plug socket 20 connected thereto in multiple. It is to be noted that there is no fuse in the neutral lead at any point. Now, this differs from the ordinary construction in which two local leads extend from each switch through two fuses to a supply main and the neutral. Thus, in the present instance, this form of wiring effects a saving of six fuses and their sockets as well as five local leads and experience has shown that the cost of manufacture of a small stove of this type is thereby reduced to the amount of five dollars since not only is material saved but there is a marked saving in labor in connecting up.

We will now consider the specific construction of the fuse block used herewith. This block has a base 23 of elongated rectangular shape in plan and extending from end to end of this block adjacent one side thereof is a pair of spaced channels 24 and 25, the channel 24 being near the side and deeper than the channel 25. Slots 26 extend inwardly from the other side of the base and merge into circular recesses 27 which in turn merge into larger circular recesses 28 each communicating with one of the channels by a suitable passage, those passages to the channel 24 passing under the channel 25. In the channels 24 and 25 are fixed the bus bars 16 and through the passages extend the bus branches 17 which terminate in the inner recesses 28. These inner recesses have fuse sockets 29 seated in them for the reception of ordinary screw plug fuses (not shown) the outer recesses and slots accommodate connector terminals 30 which may be secured to lugs 31 formed on the sockets 29. At one end the channels are enlarged as at 32 so as to accommodate the supply line terminals 33 carried by the supply mains 14. Leading in from this end is an L-shaped slot 34 which opens out through the same side of the block as the slots 26, being enlarged adjacent its ends to accommodate the main neutral terminal 35, connected to the neutral 15, and the local neutral connection 36. In the angle of this slot is secured the bus bar 21 which thus connects the elements 35 and 36. A sectional cover 37 is secured to this base, being provided with suitable openings for the fuse sockets. It is obvious that this block and its cover are to be made of porcelain or other suitable insulating material and it will be plain that the fuse block thus constructed is very compact and economical to manufacture.

The switch as here shown is a typical switch for the purpose such as is known as the "diamond H" switch and is provided with a shell 38 supporting posts 39, certain of which have upper contacts 40 while certain of the posts have a lower contact 41. The switch also has a central post 42 which carries a pointer 43 traversing a marked shell cover 44. The post 42 carries a lower contact plate 45 with two contact fingers 46 and this post also carries an upper contact plate 47 provided with three contact fingers 48. This is merely a typical form of switch such as is in common use and other switches may be substituted. In Figure 4 there are shown various positions for the switch elements as marked above the different heating elements. However, it is particularly to be noted that the wires 19 from the switches are evenly distributed between the bus bars 16. That is to say, each bus bar has an equal number of fuses and their wire connection connected thereto. In this way a balance on each side of the neutral is maintained.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an electric stove, a series of heating elements, a neutral lead to which each of said elements is connected and forming the common return therefor, a fuse block, feed bus bars carried thereby, a series of fuse receptacles carried by the block, said receptacles and single feed connections between respective heating elements and fuse receptacles.

2. In an electric stove, a series of heating elements, a neutral lead to which each of said elements in connected and forming the common return therefor, a fuse block, feed bus bars carried thereby, a series of fuse receptacles carried by the block, said receptacles single feed connections between respective heating elements and fuse receptacles, and a series of switches equal in number to the heating elements and each interposed between one such heating element and its fuse, the connection between the neutral and the heating elements being through said switches.

3. In an electric stove, a series of heating elements, a neutral lead to which each of said elements is connected and forming the common return therefor, a fuse block, feed bus bars carried thereby, a series of fuse receptacles carried by the block, said receptacles being equally balanced between said bus bars single feed connections between respective heating elements and fuse receptacles, a series of switches equal in number to the heating elements and each interposed between one such heating element and its fuse, the connection between the neutral and the heating elements being through said switches, an unfused bus bar carried by the block and having the neutral lead connected thereto, and line wire connections on said fuse block for connecting line wires to the respective bus bars.

In testimony whereof I have affixed my signature.

ROBERT H. MacINNES.